No. 736,877.

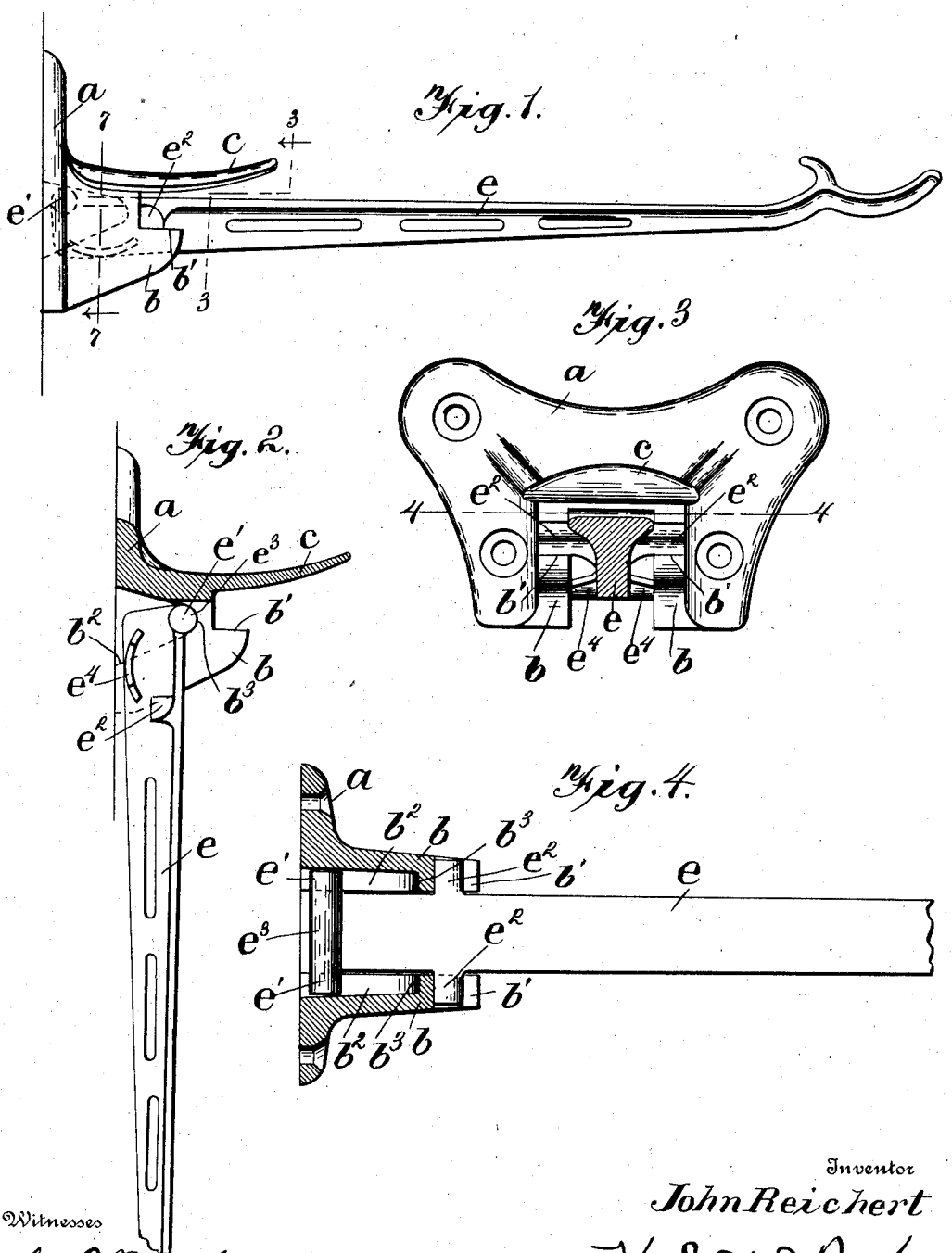

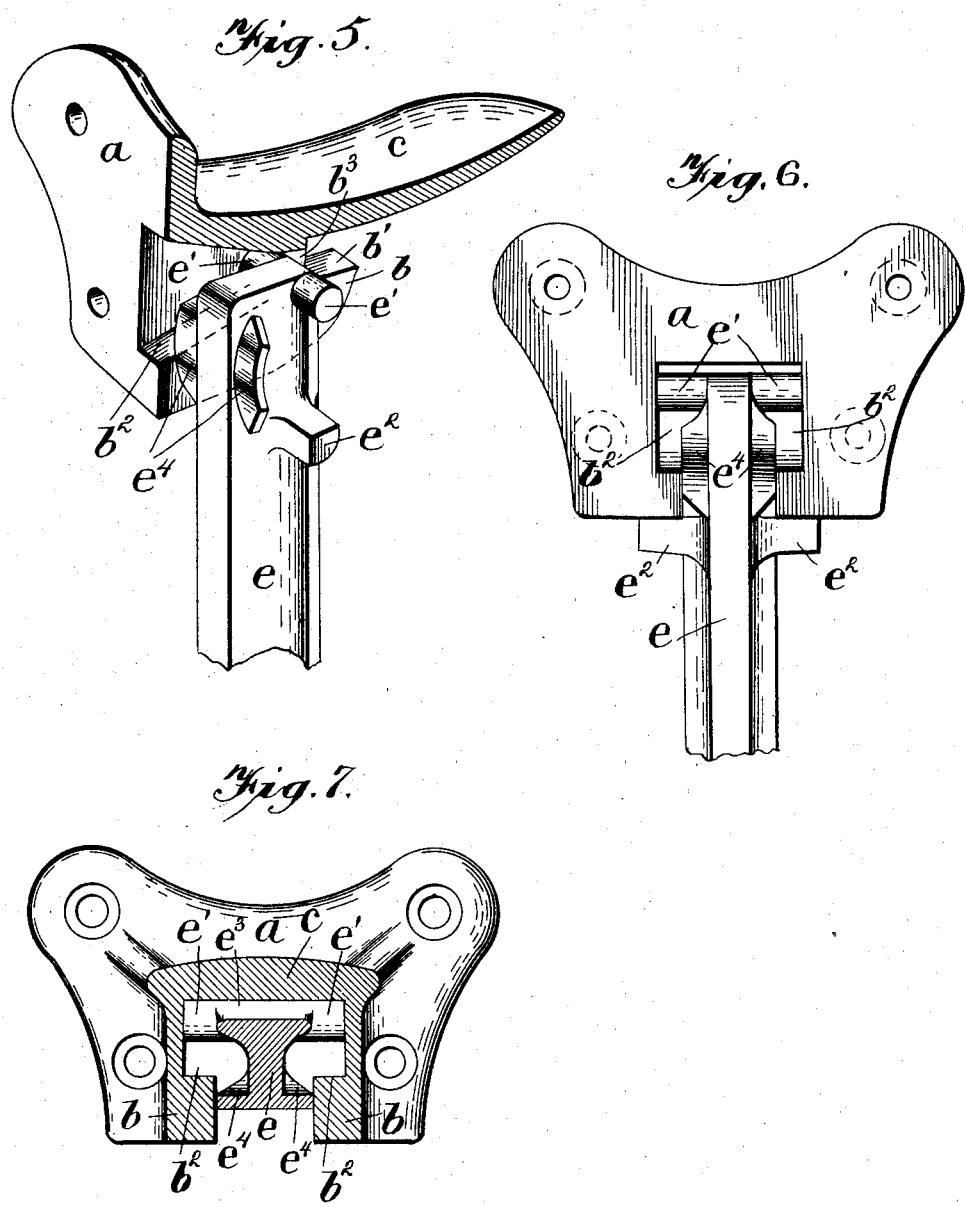

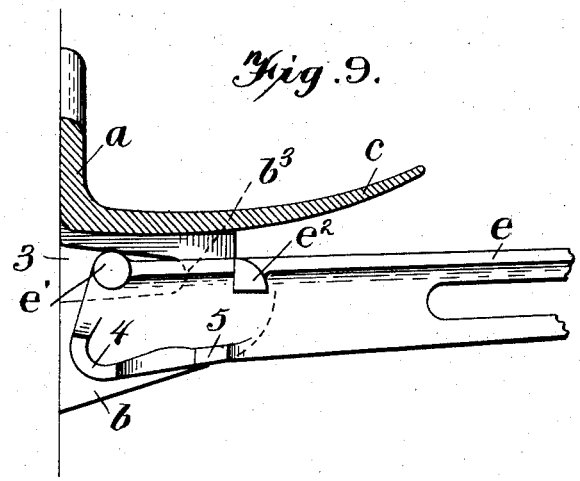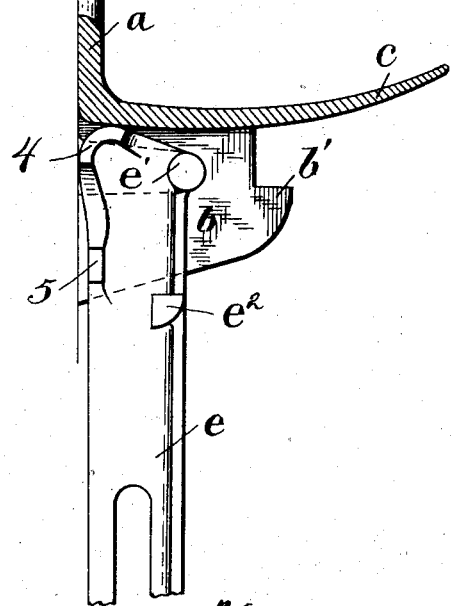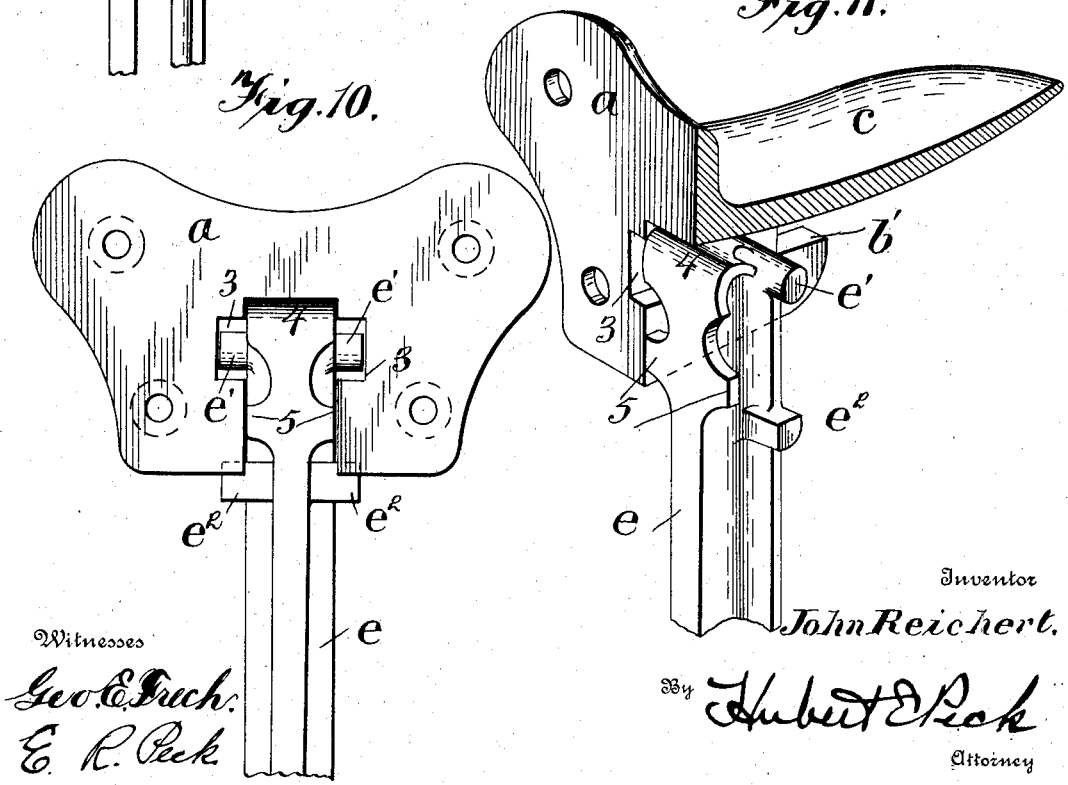

Patented August 18, 1903.

UNITED STATES PATENT OFFICE.

JOHN REICHERT, OF RACINE, WISCONSIN, ASSIGNOR OF ONE-HALF TO LUCIUS J. ELLIOTT, OF RACINE, WISCONSIN.

HARNESS-HANGER.

SPECIFICATION forming part of Letters Patent No. 736,877, dated August 18, 1903.

Application filed February 24, 1902. Serial No. 95,312. (No model.)

*To all whom it may concern:*

Be it known that I, JOHN REICHERT, a citizen of the United States, residing at Racine, Racine county, State of Wisconsin, have invented certain new and useful Improvements in Harness-Hangers; and I do hereby declare the following to be a full, clear, and exact description of the invention, such as will enable others skilled in the art to which it appertains to make and use the same.

This invention relates to certain improvements in harness-hangers; and the objects and nature of my invention will be readily understood by those skilled in the art in the light of the following explanations of the constructions shown in the accompanying drawings as examples of devices within the spirit and scope of my invention.

My invention consists in certain novel features in construction and in combinations or arrangements of parts, as more fully and particularly pointed out and specified hereinafter.

Referring to the accompanying drawings, Figure 1 is a side elevation showing the swinging arm in its elevated position, dotted lines indicating hidden parts. Fig. 2 is a sectional elevation showing the swinging arm lowered and partially broken away, dotted lines indicating hidden parts. Fig. 3 is a sectional elevation on the line 3 3, Fig. 1. Fig. 4 is a sectional plan on the line 4 4, Fig. 3, the swinging arm being shown in its elevated position and partially broken away, the wall-bracket being shown in horizontal section. Fig. 5 is a perspective view, the wall-bracket being partially broken away, the arm being shown in the vertical position and partially broken away. Fig. 6 is a rear elevation, the arm shown in its vertical position and partially broken away. Fig. 7 is a vertical section on the line 7 7, Fig. 1. Fig. 8 is a vertical section through a bracket, showing the arm partially broken away, and in elevation illustrating a different detailed arrangement from that shown in the preceding figures. Fig. 9 is a sectional elevation of the device shown in Fig. 8, the arm being shown in its elevated position and partially broken away. Fig. 10 is a rear elevation of the structure shown in Fig. 8, the arm being shown in its lowered position and partially broken away. Fig. 11 is a perspective view, partially broken away, of the construction shown in Fig. 8 and corresponding to the showing of Fig. 5 of the other structure shown.

My invention comprises a peculiarly-arranged socket or support formed to receive and coöperate with a vertically-swinging supporting-arm to uphold said arm in its raised or horizontal position and in its lowered or inoperative position. Any suitable frame or supporting device can be provided with this socket, and although I show a wall-bracket formed and constructed to receive and carry said arm, yet I do not wish to so limit my invention. The bracket or support shown in the drawings is composed of a vertical base $a$, adapted to abut against the wall or other part of a building or any proper firm support and be secured thereto by fastenings passed through the holes shown in the upper and lower parts of the said flat base portion or portions. This base is formed with the forwardly-extending socket composed of the two forwardly-extending side walls $b\ b$, vertically disposed and located a distance apart, and the horizontally-disposed forwardly-extending top wall $c$, connecting the top edges of the side walls and closing the top of the socket. The socket is open at the front, rear, and bottom. At the rear the socket preferably opens completely through the base and is there closed by the object against which said base is secured. The front ends of the side walls are rabbeted at their upper portions or are formed with the forwardly-projecting supporting shoulders or lugs $b'\ b'$, located a distance below the under face of the top wall $c$. The bottom edges of said side walls $b\ b$ are usually curved or tapered upwardly and forwardly to meet the upper faces of said supporting-lugs $b'\ b'$. The opposite inner vertical faces of the walls $b\ b$ are preferably formed with guideways or guiding and supporting shoulders or flanges. In the example shown these guideways are formed by the upwardly-facing shoulders $b^2\ b^2$, extending inwardly and upwardly from the rear face of the base along the opposite inner faces of the socket and at the front terminating in stop-shoulders $b^3\ b^3$ near the front vertical edges of the walls and usually above the horizontal plane of the top faces of the two lugs or supports $b'$ $b'$. The top wall $c$ is usually extended forwardly a distance beyond the side walls $b$ $b$ and, if desired, can be extended laterally and have its upper surface rounded and approximately smooth, and, if desired, the said extended wall can be curved upwardly to a slight extent. This top wall is suitably formed in any desired manner to form a supporting saddle or ledge to perform certain functions, as hereinafter explained. This supporting-bracket is preferably cast or otherwise formed in one piece, and it can be easily and economically cast and forms a most strong and durable article, which can be easily and economically finished up.

$e$ is the swinging supporting or bracket arm carried by the wall-bracket. The outer end of this arm is formed in any suitable manner to hold the harness from slipping off said end as the arm is moving vertically and also when the arm is in its elevated or horizontal position. The inner end of the arm, preferably at the upper inner corner, is provided with the oppositely-projecting trunnions $e'$ $e'$. The inner end of the arm is so formed with respect to the socket of the bracket that the inner end of the arm can be inserted from the rear into said socket, the arm hanging down through the open bottom of the socket and the trunnions $e'$ $e'$ resting on the ledges or shoulders $b^2$ $b^2$ and supporting the arm. The bracket is then secured to the wall or other support, and the end of the arm is thus confined in the socket. The trunnions turn on said shoulders as the arm swings vertically.

$e^2$ $e^2$ are oppositely-projecting transverse stop or supporting lugs or projections arranged on opposite sides of the arm intermediate its length and the proper distance outwardly from the trunnions $e'$. These supporting-lugs are arranged at the exterior of the socket of the bracket and overlapping the edges of the walls $b$ $b$ of the socket and are adapted to rest above and on the lugs $b'$ $b'$ to hold the swinging arm in its elevated or approximately horizontal position. When the arm is in this elevated position, the supporting-lugs $e^2$ serve as fulcrums and the portion of the arm in rear thereof bears upwardly against the top wall $c$ to maintain and firmly support the arm in its said horizontal position. When the arm is in this position, the trunnions are located at the upper portion of the inner end of the socket through the bracket and are elevated above the supporting ledges or shoulders therefor in the bracket. If desired, I can upwardly enlarge (see $e^3$) the arm at the upper face of its rear or inner extremity and form a corresponding enlargement or depression in the top wall of the socket at the inner end thereof. Hence in order to release the arm and permit downward swing thereof to the vertical position it is necessary to first slightly elevate the free end of the arm—say until the arm engages the under side of the forwardly-projecting saddle $c$ and the enlargement or stop $e^3$ moves down from the depression in the top wall of the socket. The arm can then be moved outwardly longitudinally of itself until the supporting-lugs $e^2$ pass forwardly beyond and drop off the ears or lugs $b'$ and the trunnions engage the stops $b^3$ and drop onto the ledges $b^2$. The swinging arm can then swing down, the supporting-lugs thereof moving rearwardly along the under edges of the walls $b$ $b$ and the trunnions turning and sliding rearwardly on the ledges $b^2$.

In applying harness to the hanger a portion of the harness is first hung on the saddle $c$ and another part of the harness on the free end of the lowered arm. The free end of said arm is then swung upwardly, so that the trunnions turn about at the stops $b^3$ at the front ends of ledges $b^2$. When the arm strikes the saddle $c$, the supporting-lugs of the arm will be above the horizontal plane of the ears $b'$, and the arm should then be moved in longitudinally until the supporting-lugs thereof engage the front edges of walls $b$ above said ears, and the arm can then be allowed to drop down to its normal horizontal position, as before described, carrying the harness in the manner desired, so that it can be easily delivered in a convenient manner when required.

$e^4$ $e^4$ are guides or stops formed on the opposite side faces of the bottom rib of the rear end portion of the arm to one side of and between the transverse planes of the trunnions and supporting-lugs of said arm. These guides $e^4$ are located below the ledges $b^2$ and engage the inner vertical faces of the walls $b$ to maintain the arm in the proper alinement.

The arm as described can be economically and easily formed in one piece of metal, usually as a single casting, and is usually strengthened and braced by the longitudinal bottom truss or flange about as shown.

By the employment of this device as a harness-hanger or otherwise I avoid the employment of objectionable pivot-pins or rivets and the necessity of longitudinally slotting the end of the arm; also, my arm when lowered can rest close against the wall.

I do not wish to limit myself to all the details and arrangements shown in Sheets 1 and 2 of the drawings. For instance, on Sheet 3 I show arrangements differing specifically from said other constructions. On said Sheet 3 I show the socket formed with horizontally-disposed grooves or ways 3 3, opening through the rear face of the base and extending forwardly and terminating at the front in the stops $b^3$ to receive the trunnions $e'$ $e'$ of the swinging arm, as hereinbefore described. This arrangement is designed, among other reasons, to prevent the trunnions sliding downwardly and inwardly as the arm is being swung, and hence avoid possibility of binding of the parts. On Sheet 3 the rear corner or lower end of arm $e$ is shown formed with a curved or rounded and enlarged bearing-surface 4, arranged to bear against the partition or support to which the bracket is secured when the arm is in its lowered position, (see Fig. 8,) and hence hold the trunnions forward against the stops $b^3$. As the arm is swung forwardly and upwardly (turning on trunnions $e'$ $e'$) the said bearing or abutting surface bears and turns against the wall or partition and holds said trunnions at their limit to prevent the upper end of the arm sliding inwardly and the lugs $e^2$ binding against the lower edges of the walls $b$ $b$. When the arm $e$ has almost reached the horizontal position, the said abutment or bearing-surface leaves the wall or partition, so that the arm can be moved inwardly to bring the lugs $e^2$ above the shoulders $b'$, (see Fig. 9,) with the trunnions resting against the upper ledges or walls of the grooves 3 3. In this construction the arm is upheld by the trunnions $e'$ $e'$ and the lugs $e^2$ $e^2$, and the enlargement $e^3$ performs no function such as ascribed to it in the construction shown in Sheets 1 and 2. On Sheet 3 the upper wall of the socket is shown recessed merely to receive the abutment or bearing 4 when the arm is hanging in the horizontal position. (See Figs. 8, 10, 11.) The bearing-surface 4 is extended laterally to form a wide bearing-surface against the wooden wall or partition and also to form end abutments or stops to engage the inner vertical face of the walls $b$ $b$ of the socket to prevent lateral or side play of the arm. The intermediate lugs or projections 5 5 also engage the inner walls of the socket and hold the arm against lateral play when the arm is raised or lowered.

It is evident that various changes and modifications might be resorted to in the forms, constructions, and arrangements of parts described without departing from the spirit and scope of my invention. Hence I do not wish to limit myself to the construction shown.

Having thus fully described my invention, what I claim, and desire to secure by Letters Patent of the United States, is—

1. A supporting-bracket formed with a transverse socket, the top wall of the socket projecting forwardly from and above the socket and forming a harness-supporting saddle, in combination with a vertically-swinging arm having its end confined in said socket, the upward swing of said arm limited by said saddle, substantially as described.

2. A harness-hanger comprising a supporting-bracket having a transverse socket adapted to receive a bracket-arm, the top wall of the socket extended forwardly beyond the socket and curved upwardly to form a harness-supporting saddle above said arm, substantially as described.

3. A harness-hanger comprising a supporting-bracket formed with a transverse socket having side and top walls, the inner faces and the front end of the side walls having supporting-shoulders, and a vertically-swinging and longitudinally-movable arm having its rear end confined in said socket and formed with opposite trunnions to rest on and suspend the arm from said inner shoulders, said arm formed with stops at the exterior of said socket to rest on said front end shoulders thereof when the arm is in its elevated position, substantially as described.

4. In a harness-hanger, a supporting-bracket having a transverse socket with a top wall and internal supporting shoulders or ledges having front end stops and front supports, in combination with a vertically-swinging and longitudinally-movable arm having its inner end confined in said socket and provided with trunnions adapted to rest on said internal shoulders and support the arm when hanging, said arm having stops to rest on said front supports and hold the arm in its elevated position with its rear portion bearing up against said top wall, substantially as described.

5. In a harness-hanger, in combination, a support having a socket opening at its rear end through the support and comprising side walls formed at their inner faces with grooves open at the rear end of the socket and having front stops, a vertically-swinging and longitudinally-movable arm at its rear portion having lateral trunnions turning and sliding in said grooves, said arm movable into the socket through the open rear end thereof, and means whereby the arm is supported in its horizontal position.

6. In combination, in a harness-hanger, a supporting-bracket having a transverse socket opening therethrough, the inner faces of the side walls of said socket having ledges at their front ends terminating in stops, the front ends of said walls provided with supporting-shoulders, and a swinging and longitudinally-movable arm having its inner end located between said walls and provided with lateral trunnions resting on said ledges and supporting the arm when in its lowered position, said arm, when in its horizontal position resting on said front supporting-shoulders, substantially as described.

7. In a harness-hanger, the combination, of a support having a transverse socket formed by a horizontal top and two vertical side walls, said side walls having notched front edges forming supporting-shoulders below said top wall, and a vertically-swinging and longitudinally-movable arm having its inner end loosely confined between said side walls and below said top wall, said arm having rigid lateral lugs at the exterior of the socket, when the arm is held in its elevated position, said lugs resting on said shoulders and the arm in rear thereof bearing up against said top wall, substantially as described.

8. In a harness-hanger, the combination of a support having vertical side walls with a top abutment, said side walls having front supporting-shoulders, and a vertically-swinging and longitudinally-movable arm at its inner end confined loosely between said walls and at its rear having an enlargement, and at the exterior of said walls provided with stops adapted to rest on said shoulders when the arm is held in its horizontal position with its rear portion bearing up against said abutment, substantially as described.

9. In a harness-hanger, in combination, a support having a transverse socket the side walls thereof having supporting-shoulders at their front ends and their lower edges curved up to said shoulders, the inner faces of said walls formed with the inclined ledges extending forwardly from the rear edges thereof and at their front ends terminating in stops, and the vertically-swinging and longitudinally-movable arm having its rear end confined between said walls and provided with lateral trunnions adapted to rest on said ledges and engage said front stops and with side guides to engage said walls below said ledges, said arm at the exterior of the socket provided with lateral supports adapted to rest on said shoulders, substantially as described.

10. In combination, in a harness-hanger, a support having a socket therethrough and front supports, and a swinging and longitudinally-movable hanger-arm having trunnions, exterior supporting-lugs and an inner end bearing-surface or abutment, substantially as described.

11. In combination, in a harness-hanger, a support having a transverse socket opening through the rear end of the support and having internal trunnion-receiving supports and exterior front end supports, and the swinging and longitudinally-movable hanger-arm having the lateral trunnions, lateral supports at the exterior of the socket and the inner end rounded bearing-surface or abutment forming lateral guides, substantially as described.

In testimony whereof I affix my signature in presence of two witnesses.

JOHN REICHERT.

Witnesses:
CLARA SCHLEGEL,
L. SCHLEGEL.